US008385865B2

(12) United States Patent
Camp, Jr. et al.

(10) Patent No.: US 8,385,865 B2
(45) Date of Patent: Feb. 26, 2013

(54) EVOLVED EDGE RECEIVER

(75) Inventors: William O. Camp, Jr., Chapel Hill, NC (US); Toby John Bowen, Durham, NC (US); Leland Scott Bloebaum, Cary, NC (US)

(73) Assignee: Sony Mobile Communications AB, Lund (SE)

( * ) Notice: Subject to any disclaimer, the term of this patent is extended or adjusted under 35 U.S.C. 154(b) by 1233 days.

(21) Appl. No.: 12/190,052

(22) Filed: Aug. 12, 2008

(65) Prior Publication Data

US 2010/0041360 A1    Feb. 18, 2010

(51) Int. Cl.
*H04B 7/08* (2006.01)
*H04B 7/00* (2006.01)
*H04B 1/26* (2006.01)
*H03J 7/32* (2006.01)
*H04M 1/00* (2006.01)

(52) U.S. Cl. ........ 455/132; 455/140; 455/147; 455/258; 455/318; 455/552.1

(58) Field of Classification Search .......... 455/131–133, 455/140–144, 179.1–180.3, 188.1–189.1, 455/552.1–553.1
See application file for complete search history.

(56) References Cited

U.S. PATENT DOCUMENTS

| 5,974,302 | A | * | 10/1999 | Adamiecki et al. ............. 455/84 |
|---|---|---|---|---|
| 6,018,553 | A | * | 1/2000 | Sanielevici et al. ............ 375/334 |
| 6,029,052 | A | * | 2/2000 | Isberg et al. .................. 455/131 |
| 6,081,697 | A |   | 6/2000 | Haartsen |
| 6,201,952 | B1 | * | 3/2001 | Shimizu et al. ............ 455/180.1 |
| 6,226,509 | B1 |   | 5/2001 | Mole et al. |
| 6,675,024 | B1 | * | 1/2004 | Loke et al. ................. 455/553.1 |
| 6,704,558 | B1 |   | 3/2004 | Sorrells et al. |
| 6,728,517 | B2 | * | 4/2004 | Sugar et al. ...................... 455/73 |
| 7,092,676 | B2 | * | 8/2006 | Abdelgany et al. ............. 455/76 |
| 7,590,432 | B2 | * | 9/2009 | Behzad et al. ................ 455/574 |
| 7,672,689 | B2 | * | 3/2010 | Khlat et al. ................ 455/552.1 |
| 2002/0017981 | A1 |   | 2/2002 | Turner |
| 2002/0173337 | A1 | * | 11/2002 | Hajimiri et al. ............... 455/552 |
| 2006/0189286 | A1 | * | 8/2006 | Kyu et al. ..................... 455/144 |
| 2007/0021080 | A1 | * | 1/2007 | Kuriyama et al. ............ 455/132 |
| 2008/0112519 | A1 | * | 5/2008 | Jung et al. ..................... 375/350 |
| 2010/0144301 | A1 | * | 6/2010 | Khlat et al. .................... 455/260 |

OTHER PUBLICATIONS

International Search Report mailed May 26, 2009 for International Application No. PCT/US2008/083107 filed Nov. 11, 2008.
3GPP TSG-RAN WG1 #52-bis, "HS-DPCCH Design for Dual Carrier HSDPA," R1-081358, Mar. 31-Apr. 4, 2008, Shenzhen, China, 9 pages.

(Continued)

*Primary Examiner* — Simon Nguyen
(74) *Attorney, Agent, or Firm* — Coats & Bennett, P.L.L.C.

(57) ABSTRACT

The wireless receiver of the present invention accommodates dual-carrier Evolved EDGE without significantly impacting existing receiver architectures. The inventive receiver comprises a shared local oscillator and two image-rejecting downconverters. The local oscillator generates a local oscillator frequency between two carrier frequencies of adjacent radio channels. The receiver receives a signal in each of the adjacent radio channels. In a dual-carrier mode, a first image-rejecting downconverter uses the local oscillator frequency to downconvert a first signal received in the first radio channel while rejecting a second signal received in the second radio channel. A second image-rejecting downconverter uses the local oscillator frequency to downconvert the second signal while rejecting the first signal. In a diversity mode, the first and second image-rejecting downconverters use the local oscillator frequency to downconvert the signal received in one of the radio channels while rejecting the signal received in the other radio channel.

20 Claims, 3 Drawing Sheets

OTHER PUBLICATIONS

3GPP TSG-RAN WG1-#52-bis, "Link Analysis of HS-DPCCH ACK/NACK for Dual Carrier HSDAP," R1-081359, Mar. 31-Apr. 4, 2008, Shenzhen, China, 4 pages.

3GPP TSG-RAN WG1 #52-bis, "Link Analysis of HS-DPCCH CQI for Dual Carrier HSDPA," R1-081360, Mar. 31-Apr. 4, 2008, Shenzhen, China, 8 pages.

3GPP TSG-RAN WG1 #52bis, "System Benefits of Dual Carrier HSDPA," R1-081361, Mar. 31-Apr. 4, 2008, Shenzhen, China, 8 pages.

3GPP TSG-RAN WG1 #52bis, "Dual Carrier HSDPA assumptions and standards impact," R1-081437, Mar. 31-Apr. 4, 2008, Shenzhen, China, 6 pages.

3GPP TSG-RAN WG1 #52bis, "Dual Carrier operation for CELL_DCH," R1-081438, Mar. 31-Apr. 4, 2008, Shenzhen, China, 5 pages.

3GPP TSG RAN WG1 Meeting #52bis, "Initial Multi-Carrier HSPA performance evaluation," R1-081546, Mar. 31-Apr. 4, 2008, Shenzen, China, 7 pages.

* cited by examiner

EVOLVED EDGE RECEIVER

BACKGROUND

The present invention relates generally to wireless receivers, and more particularly to dual-carrier wireless terminal receivers for Evolved EDGE.

EDGE (Enhanced Data Rates for GSM Evolution) is a wireless network protocol that provides increased capacity, data transmission rates, and/or data transmission reliability over conventional GSM networks. EDGE uses the same TDMA frame structure, logic channel, and 200 kHz carrier bandwidth as GSM. Thus, in most instances, implementing EDGE requires a simple upgrade to an existing GSM network.

EDGE was initially introduced in the United States in 2003, and quickly gained in popularity. As of May 2007, 223 commercial GSM/EDGE networks exist in 113 countries, out of 287 mobile network operator commitments in 142 countries (source: Global mobile Suppliers Association). While EDGE provides improved performance over conventional GSM, e.g., data speeds up to 200 kb/s, further improvements to EDGE, known as "Evolved EDGE," are currently under development by the 3rd-Generation Partnership Project (3GPP). (For details, see 3GPP TR 45.912, "Feasibility study for evolved GSM/EDGE Radio Access Network (GERAN)," v. 7.2.0, Mar. 20, 2007, available as of the filing date of the present application at www.3gpp.org/FTP/Specs/html-info/45912.htm, hereinafter referred to as "Evolved EDGE Feasibility Study.") With enhancements including receiver diversity, higher-order modulation, and a new dual-carrier mode, Evolved EDGE promises data rates exceeding 1 Mb/second under some circumstances. Because Evolved EDGE also uses the same TDMA frame structure, logic channels, and carrier bandwidth as GSM networks, Evolved EDGE may also easily be implemented on existing GSM networks. However, new mobile terminals must be designed to fully exploit these improvements. Currently, wireless terminal vendors are reluctant to implement dual-carrier Evolved EDGE in wireless terminals due to expected impacts on radio architecture. Thus, there remains a need for an improved wireless terminal that is compatible with not only the existing GSM and EDGE networks, but is also compatible with Evolved EDGE networks.

SUMMARY

The present invention provides a wireless receiver that accommodates dual-carrier Evolved EDGE signals in adjacent radio channels and/or dual-mode operations. The receiver includes a shared oscillator unit and two image-rejecting downconverters. By using the same local oscillator to downconvert received signals, receiver embodiments of the present invention save space and power. Further, the receiver embodiments of the present invention minimize the impact of Evolved EDGE to the receiver architecture by reusing available downconverter hardware to downconvert the received dual-carrier signals.

Exemplary embodiments of the invention comprise a dual-carrier EDGE receiver comprising a shared oscillator, a first image-rejecting downconverter, and a second image rejecting downconverter. The shared oscillator unit generates a local oscillator frequency between two carrier frequencies of adjacent first and second radio channels. The first image-rejecting downconverter is operatively connected to the shared oscillator unit and is configured to downconvert a first EDGE signal received in the first radio channel while rejecting a second EDGE signal received in the second radio channel. The second image-rejecting downconverter is operatively connected to the shared oscillator unit and is configured to downconvert the second EDGE signal while rejecting the first EDGE signal.

In one exemplary dual-carrier EDGE receiver, the first image-rejecting downconverter comprises a summing combiner to output the downconverted first EDGE signal while rejecting the second EDGE signal, and the second image-rejecting downconverter comprises a subtracting combiner to output the downconverted second EDGE signal while rejecting the first EDGE signal.

In one exemplary dual-carrier EDGE receiver, the first EDGE signal comprises an EDGE signal received in an upper radio channel relative to the local oscillator frequency, and the second EDGE signal comprises an EDGE signal received in a lower radio channel relative to the local oscillator frequency.

The exemplary dual-carrier EDGE receiver may further comprise a single antenna connected to an input of both the first and second image-rejecting downconverters.

The exemplary dual-carrier EDGE receiver may further comprise a first antenna connected to an input of the first image-rejecting downconverter and a separate second antenna connected to an input of the second image-rejecting downconverter.

Exemplary embodiments of the present invention also include a method for processing received signals. One exemplary method comprises generating a shared local oscillator frequency between two carrier frequencies of adjacent first and second radio channels; downconverting a first signal received in the first radio channel while rejecting a second signal received in the second radio channel using the shared local oscillator frequency in a first image-rejecting downconverter; and downconverting the second received signal while rejecting the first received signal using the shared local oscillator frequency in a second image-rejecting downconverter.

In one exemplary method, downconverting the first signal comprises using a summing combiner in the first image-rejecting downconverter to output the downconverted first signal while rejecting the second signal, and downconverting the second signal comprises using a subtracting combiner in the second image-rejecting downconverter to output the downconverted second signal while rejecting the first signal.

In one exemplary method, using the summing and subtracting combiners in the respective first and second image-rejecting downconverters comprises using the summing and subtracting combiners in the respective first and second image-rejecting downconverters during a first mode, and wherein during a second mode the method may further comprise using a summing combiner or a subtracting combiner in both the first and second image-rejecting downconverters to output the downconverted first signal from both image-rejecting downconverters while rejecting the second signal.

In one exemplary method, the first mode comprises a dual-carrier mode and the second mode comprises a diversity mode.

The exemplary method may further comprise connecting the first and second image-rejecting down converters to a single antenna during the first mode and connecting the first and second image-rejecting down converters to different antennas during the second mode.

The exemplary method may further comprise connecting the first and second image-rejecting downconverters to different antennas during the first and second modes.

In one exemplary method, the first signal comprises an EDGE signal received in an upper radio channel relative to the local oscillator frequency, and the second signal comprises an EDGE signal received in a lower radio channel relative to the local oscillator frequency.

Exemplary embodiments of the invention also comprise a dual-mode receiver comprising a shared oscillator, a processor, a first image-rejecting downconverter, and a second image rejecting downconverter. The shared oscillator unit generates a local oscillator frequency offset from one or both carrier frequencies of adjacent first and second radio channels. The processor configures the receiver to operate in a first mode or a second mode. The first image-rejecting downconverter is operatively connected to the shared oscillator unit and is configured to downconvert a first signal received in the first radio channel while rejecting a second signal received in the second radio channel when the receiver is configured to operate in either the first or second modes. The second image-rejecting downconverter is operatively connected to the shared oscillator unit, and is configured to downconvert the second signal while rejecting the first signal when the receiver is configured to operate in the first mode and downconvert the first signal while rejecting the second signal when the receiver is configured to operate in the second mode.

During operation in the first mode of one exemplary dual-mode receiver, the first image-rejecting downconverter comprises a summing combiner to output the downconverted first signal while rejecting the second signal, and the second image-rejecting downconverter comprises a subtracting combiner to output the downconverted second signal while rejecting the first signal.

During operation in the second mode of one exemplary dual-mode receiver, the first and second image-rejecting downconverters both comprise either a summing combiner or a subtracting combiner.

In one exemplary dual-mode receiver, the processor connects the first and second image-rejecting downconverters to a single antenna when the receiver operates in the first mode, and the processor connects the first and second image-rejecting downconverters to different antennas when the receiver operates in the second mode.

In one exemplary dual-mode receiver, the first signal comprises an EDGE signal received in an upper radio channel relative to the local oscillator frequency and the second signal comprises an EDGE signal received in a lower radio channel relative to the local oscillator frequency when the receiver operates in the first mode.

In one exemplary dual-mode receiver, the processor controls the shared oscillator unit to generate the local oscillator frequency between the carrier frequencies of the adjacent first and second radio channels during operation in the first mode, and the processor controls the shared oscillator unit to generate the local oscillator frequency offset from one of the carrier frequencies of the first and second radio channels during operation in the second mode.

In one exemplary dual-mode receiver, the processor connects the first and second image-rejecting downconverters to different antennas when the receiver operates in either the first or second modes.

In one exemplary dual-mode receiver, the first mode comprises a dual-carrier mode, and wherein the second mode comprises a diversity mode.

DETAILED DESCRIPTION

Current wireless receiver architectures may be adapted according to the present invention to accommodate dual-carrier Evolved EDGE signals. For the present invention, the dual-carrier Evolved EDGE signals are associated with two carrier frequencies in adjacent radio channels.

Figure 1:
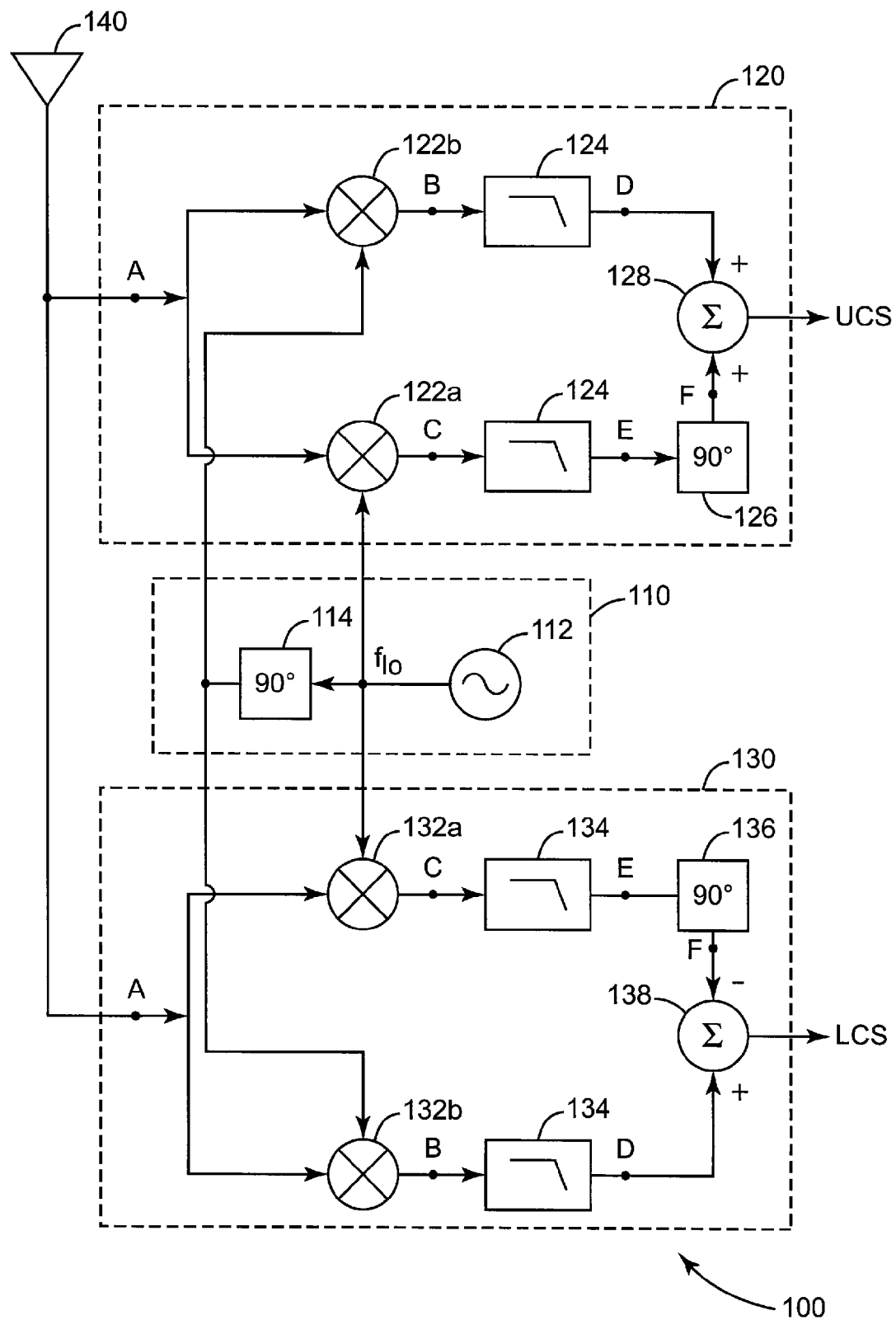
FIG. 1 shows an exemplary dual-carrier receiver according to one embodiment of the present invention.

FIG. 1 shows an exemplary dual-carrier receiver 100 according to one embodiment of the present invention. Receiver 100 comprises an oscillator unit 110 shared by two image-rejecting downconverters 120, 130, both of which also connect to a single antenna 140. It will be appreciated that the downconverters 120, 130 may alternatively connect to different antennas.

Oscillator unit 110 comprises a local oscillator 112 that generates a local oscillator frequency $f_{lo}$. The oscillator unit 110 further includes a phase shifter 114 to generate a phase shifted version of the local oscillator frequency $f_{lo}$. For dual-carrier operation, image-rejecting downconverters 120, 130 downconvert signals received in adjacent radio channels using the shared local oscillator frequency output by the oscillator unit 110 to generate an output signal, at an intermediate frequency (IF) or baseband frequency, for each of the upper and lower EDGE signals. One downconverter, e.g. downconverter 120, downconverts an upper channel signal (UCS) while rejecting a lower channel signal (LCS). The other downconverter, e.g. downconverter 130, downconverts the lower channel signal while rejecting the upper channel signal.

Figure 2:
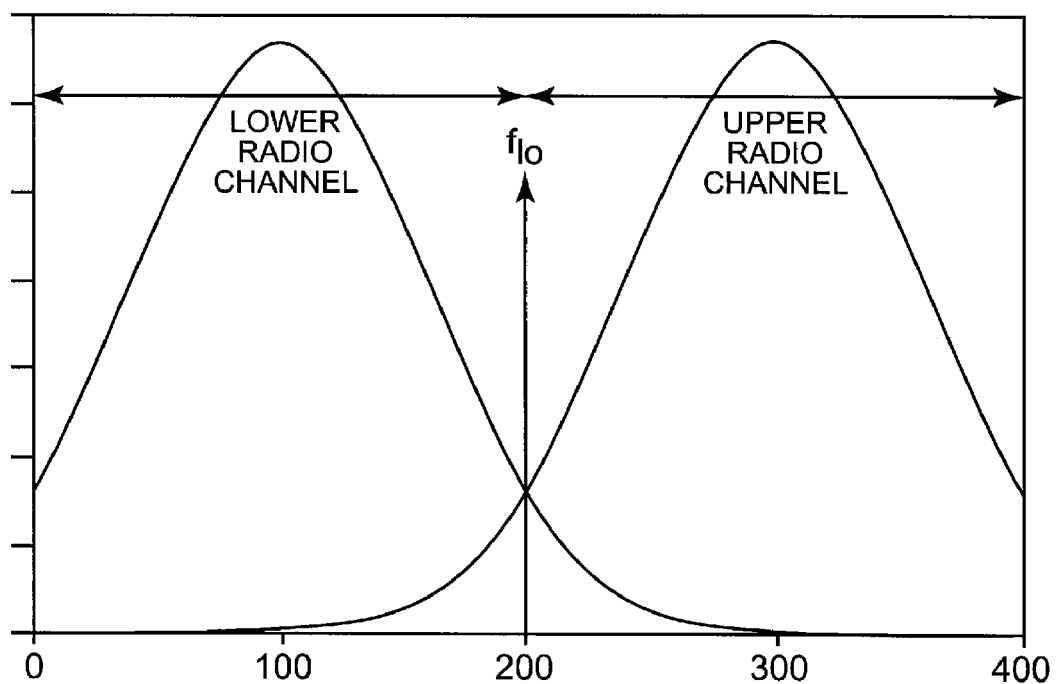
FIG. 2 shows a frequency plot of adjacent frequency bands and the corresponding local oscillator frequency.

The oscillator unit 110 is configured to generate a local oscillator frequency $f_{lo}$ between two carrier frequencies of adjacent radio channels. By setting the local oscillator frequency to a frequency offset from both carrier frequencies by an equal amount related to the bandwidth of a downconverter filter, e.g., 100 kHz, the local oscillator frequency $f_{lo}$ lies midway between the adjacent carrier frequencies of the upper and lower radio channels, as shown in FIG. 2. Using such a local oscillator frequency $f_{lo}$ with downconverters 120, 130 causes the downconverter to output signals at an IF or baseband frequency that correspond to the signals received in the upper and lower radio channels.

The downconverters 120, 130 of receiver 100 take advantage of this frequency relationship to downconvert signals received in adjacent upper and lower radio channels. More particularly, image-rejecting downconverter 120 downconverts a signal received in the upper radio channel using the shared local oscillator frequency $f_{lo}$ to output a downconverted upper channel signal while rejecting the lower channel signals. Similarly, image-rejecting downconverter 130 downconverts a signal received in the lower channel using the shared local oscillator frequency $f_{lo}$ to output a downconverted lower channel signal while rejecting the upper channel signals.

To that end, the downconverters 120, 130 each comprises a pair of mixers 122, 132, a pair of filters 124, 134, a phase shifter 126, 136, and a combiner 128, 138. A received signal is split into two paths and input to separate mixers 122a, 122b, 132a, 132b. Mixers 122a, 132a mix the received signal with the local oscillator frequency, while mixers 122b, 132b mix the received signal with the phase shifted local oscillator frequency to output in-phase and quadrature representations of the received signal. Filters 124, 134 filter the in-phase and quadrature signals according to a predetermined bandwidth, e.g., a 200 kHz bandwidth. Phase shifter 126, 136 shifts the phase of either the filtered in-phase (as shown in FIG. 1) or the filtered quadrature signal by 90°. The signals from the in-phase and quadrature paths are input to and combined by the combiners 128, 138. By appropriately combining the phase offset signals from the in-phase and quadrature paths, combiners 128, 138 output downconverted upper and lower channel signals. Table 1 illustrates this by showing the nominal phases of the upper and lower channel signals as they pass through mixers 122, 132, filters 124, 134, and phase shifter 126, 136 of the respective downconverters 120, 130.

TABLE 1

| Node | Upper Channel Signal | Lower Channel Signal |
| --- | --- | --- |
| A | 0° | 0° |
| B | 0° | 0° |
| C | −90° | +90° |
| D | 0° | 0° |
| E | −90° | +90° |
| F | −90° | −90° |

At combiners 128, 138 points D and F), the upper channel signals of the in-phase and quadrature paths are in phase while the lower channel signals of the in-phase and quadrature paths are 180° out of phase. Thus, to output the desired downconverted upper and lower channel signals, combiner 128 additively combines the combiner input signals, while combiner 138 subtractively combines the combiner input signals. As a result, for the example shown in FIG. 1, downconverter 120 comprises an upper channel downconverter and combiner 128 comprises a summing combiner that outputs the downconverted upper channel signal and rejects the lower channel signal, while downconverter 130 comprises a lower channel combiner and combiner 138 comprises a subtracting combiner that outputs the downconverted lower channel signal and rejects the upper channel signal.

The amount of signal rejection attainable by the combiners 128, 138 depends on the accuracy of the 90° phase shift provided by the phase shifters 126, 136 and on the gain balance of the combiner input signals. In practice, the combiners 128, 138 may attain at least 30 dB of unwanted signal rejection, which is generally sufficient for digital signals as the unwanted signals at these levels distorts the desired signals by only a few percentage points. Error correction techniques known in the art may be used to compensate for such distortion.

It will be appreciated that the phase shifters 126, 136 may be placed in either the in-phase or the quadrature paths. Those skilled in the art will also appreciate that either or both of phase shifters 126, 136 may be placed at different locations in the in-phase and quadrature paths to produce the same or equivalent phase relationships. The radio channel associated with the downconverted signals output by the downconverters 120, 130 is determined based on the polarity of the combiner 128, 138 and which path includes the 90° phase shift associated with the phase shifters 126, 136. For example, if the phase shifters 126, 136 of both downconverters 120, 130 are connected to the output of the filters 124, 134 in the quadrature paths, then the upper channel combiner 128 would be implemented as a subtracting combiner while the lower channel combiner 138 would be implemented as a summing combiner.

The oscillator unit, mixers, filters, phase shifters, and combiners shown in FIG. 1 are readily available in most wireless receivers. Thus, by controlling the local oscillator frequency, the combining operations, and/or the signal transmission frequencies as described above, the present invention provides a dual-carrier receiver for Evolved EDGE that reuses available receiver components.

Figure 3:
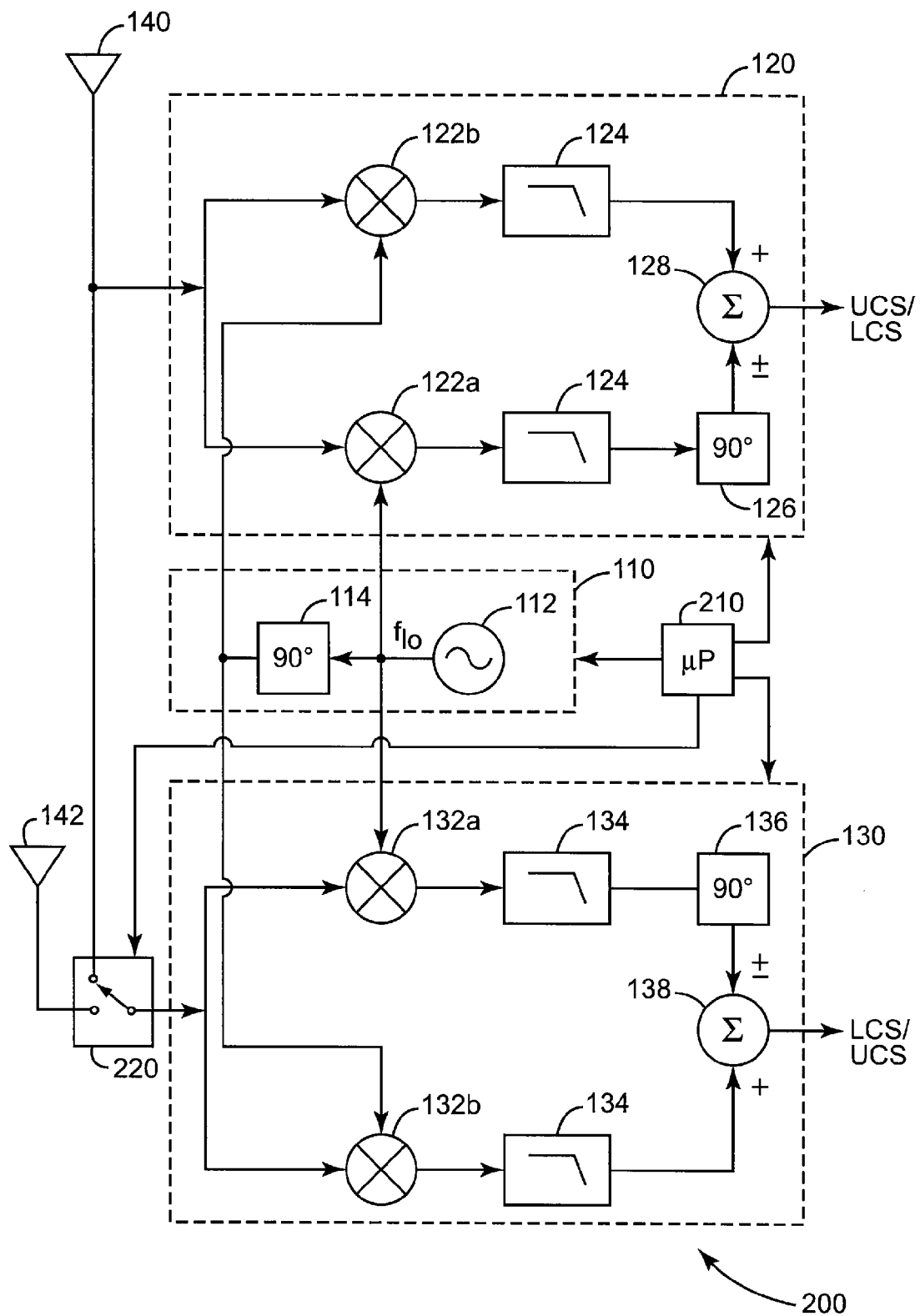
FIG. 3 shows an exemplary dual-mode receiver according to one embodiment of the present invention.

FIG. 3 shows an exemplary receiver 200 according to another embodiment of the present invention. Receiver 200 comprises a dual-mode receiver that selectively operates in either a diversity mode or a dual-carrier mode. In the diversity mode, both downconverters 120, 130 operate on signals in the same radio channel, while in the dual-carrier mode, the downconverters 120, 130 operate on signals in separate but adjacent radio channels. To that end, dual-mode receiver 200 comprises an antenna 142, a microprocessor 210, and an optional switch 220 in addition to the local oscillator unit 110, downconverters 120, 130, and antenna 140 described and shown in FIG. 1. When operating in the dual-carrier mode, microprocessor 210 configures the local oscillator unit 110 to generate a local oscillator frequency $f_{lo}$ between the carrier frequencies of the adjacent radio channels, and configures one image-rejecting downconverter 120, 130 as an upper channel downconverter and the other image-rejecting downconverter 120, 130 as a lower channel downconverter, as discussed above. If switch 220 is included, the microprocessor 210 also configures the switch to either connect both downconverters 120, 130 to a single antenna 140 (for dual-carrier mode) or to separate antennas 140, 142 (for either dual-carrier mode or diversity mode). In either case, when in the dual-carrier mode, dual-mode receiver 200 generally operates as described above and shown in FIG. 1.

When operating in the diversity mode, e.g., for existing GSM or EDGE protocols, the downconverters 120, 130 connect to separate antennas 140, 142 and microprocessor 210 determines whether the signals of interest are in an upper radio channel or a lower radio channel relative to the local oscillator frequency $f_{lo}$. The diversity mode may be configured to output either the downconverted upper channel signals or the downconverted lower channel signals depending on the location of the local oscillator frequency relative to the radio channel frequency of the desired signal. In this way, the image-rejecting downconverters 120, 130 output signals received in the same radio channel (upper or lower) to enable implementation of any known diversity combining technique. For example, if the received signals are in the upper radio channel relative to the local oscillator frequency, microprocessor 210 configures both downconverters 120, 130 as upper channel downconverters that output downconverted upper channel signals while rejecting the lower channel signals. If the phase shifters 126, 136 are both in the in-phase paths, the combiners 128, 138 for the downconverters 120, 130 in this example may both comprise summing combiners. Alternatively, if the received signals are in the lower radio channel relative to the local oscillator frequency, microprocessor 210 configures both downconverters 120, 130 as lower channel downconverters that output downconverted lower channel signals while rejecting the upper channel signals. If the phase shifters 126, 136 are both in the in-phase paths, the combiners 128, 138 for the downconverters 120, 130 in this example may both comprise subtracting combiners.

The dual-mode receiver 200 may be preconfigured for a particular operating mode or may allow dynamic selection of a desired operating mode. To switch from the dual-carrier mode to the diversity mode, the microprocessor 210 determines whether the desired signal for the diversity mode is associated with the upper radio channel or the lower radio channel of the dual-carrier mode, and configures the downconverters 120, 130 as discussed above.

To switch from the diversity mode to the dual-carrier mode, microprocessor 210 configures one downconverter 120, 130 as an upper channel downconverter and configures the other downconverter 120, 130 as a lower channel downconverter. For the example shown in FIG. 3, such a configuration would require combiner 128 to operate as a summing combiner and combiner 138 to operate as a subtracting combiner. Microprocessor 210 also determines whether the current local oscillator frequency $f_{lo}$ lies between the two carrier frequencies associated with the radio channels of the dual-carrier mode. If so, microprocessor 210 leaves the local oscillator frequency $f_{lo}$ at the current value. If not, the microprocessor 210 adjusts the local oscillator frequency $f_{lo}$ to lie between the two carrier frequencies. The microprocessor 210 may make this determination by, for example, evaluating the radio channel frequencies of the received signals or based on frequency information received in a control signal.

The present invention provides wireless receivers and corresponding methods for processing Evolved EDGE dual-carrier signals in adjacent radio channels using a single shared local oscillator and reusing available receiver components. The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A dual-carrier EDGE receiver comprising:
   a shared oscillator unit to generate a local oscillator frequency between two carrier frequencies of adjacent first and second radio channels;
   a first image-rejecting downconverter operatively connected to the shared oscillator unit, said first image-rejecting downconverter configured to downconvert a first EDGE signal received in the first radio channel while rejecting a second EDGE signal received in the second radio channel; and
   a second image-rejecting downconverter operatively connected to the shared oscillator unit, said second image-rejecting downconverter configured to downconvert the second EDGE signal while rejecting the first EDGE signal.

2. The dual-carrier EDGE receiver of claim 1 wherein the first image-rejecting downconverter comprises a summing combiner to output the downconverted first EDGE signal while rejecting the second EDGE signal, and wherein the second image-rejecting downconverter comprises a subtracting combiner to output the downconverted second EDGE signal while rejecting the first EDGE signal.

3. The dual-carrier EDGE receiver of claim 1 wherein the first EDGE signal comprises an EDGE signal received in an upper radio channel relative to the local oscillator frequency, and wherein the second EDGE signal comprises an EDGE signal received in a lower radio channel relative to the local oscillator frequency.

4. The dual-carrier EDGE receiver of claim 1 further comprising a single antenna connected to an input of both the first and second image-rejecting downconverters.

5. The dual-carrier EDGE receiver of claim 1 further comprising a first antenna connected to an input of the first image-rejecting downconverter and a separate second antenna connected to an input of the second image-rejecting downconverter.

6. A method for processing received signals comprising:
   generating a shared local oscillator frequency between two carrier frequencies of adjacent first and second radio channels;
   downconverting a first signal received in the first radio channel while rejecting a second signal received in the second radio channel using the shared local oscillator frequency in a first image-rejecting downconverter; and
   downconverting the second received signal while rejecting the first received signal using the shared local oscillator frequency in a second image-rejecting downconverter.

7. The method of claim 6 wherein downconverting the first signal comprises using a summing combiner in the first image-rejecting downconverter to output the downconverted first signal while rejecting the second signal, and wherein downconverting the second signal comprises using a subtracting combiner in the second image-rejecting downconverter to output the downconverted second signal while rejecting the first signal.

8. The method of claim 7 wherein using the summing and subtracting combiners in the respective first and second image-rejecting downconverters comprises using the summing and subtracting combiners in the respective first and second image-rejecting downconverters during a first mode, and wherein during a second mode the method further comprises using a summing combiner or a subtracting combiner in both the first and second image-rejecting downconverters to output the downconverted first signal from both image-rejecting downconverters while rejecting the second signal.

9. The method of claim 8 wherein the first mode comprises a dual-carrier mode and the second mode comprises a diversity mode.

10. The method of claim 8 further comprising connecting the first and second image-rejecting down converters to a single antenna during the first mode and connecting the first and second image-rejecting down converters to different antennas during the second mode.

11. The method of claim 8 further comprising connecting the first and second image-rejecting downconverters to different antennas during the first and second modes.

12. The method of claim 6 wherein the first signal comprises an EDGE signal received in an upper radio channel relative to the local oscillator frequency, and wherein the second signal comprises an EDGE signal received in a lower radio channel relative to the local oscillator frequency.

13. A dual-mode receiver comprising:
   a shared oscillator unit to generate a local oscillator frequency offset from one or both carrier frequencies of adjacent first and second radio channels;
   a processor to configure the receiver to operate in a first mode or a second mode;
   a first image-rejecting downconverter operatively connected to the shared oscillator unit, said first image-rejecting downconverter configured to downconvert a first signal received in the first radio channel while rejecting a second signal received in the second radio channel when the receiver is configured to operate in either the first or second modes; and
   a second image-rejecting downconverter operatively connected to the shared oscillator unit, said second image-rejecting downconverter configured to:
      downconvert the second signal while rejecting the first signal when the receiver is configured to operate in the first mode; and
      downconvert the first signal while rejecting the second signal when the receiver is configured to operate in the second mode.

14. The dual-mode receiver of claim 13 wherein during operation in the first mode, the first image-rejecting downconverter comprises a summing combiner to output the downconverted first signal while rejecting the second signal, and the second image-rejecting downconverter comprises a subtracting combiner to output the downconverted second signal while rejecting the first signal.

15. The dual-mode receiver of claim 13 wherein during operation in the second mode, the first and second image-rejecting downconverters both comprise either a summing combiner or a subtracting combiner.

16. The dual-mode receiver of claim 13 wherein the processor connects the first and second image-rejecting downconverters to a single antenna when the receiver operates in the first mode, and wherein the processor connects the first and second image-rejecting downconverters to different antennas when the receiver operates in the second mode.

17. The dual-mode receiver of claim 13 wherein the first signal comprises an EDGE signal received in an upper radio channel relative to the local oscillator frequency and the second signal comprises an EDGE signal received in a lower radio channel relative to the local oscillator frequency when the receiver operates in the first mode.

18. The dual-mode receiver of claim 13 wherein during operation in the first mode, the processor controls the shared oscillator unit to generate the local oscillator frequency between the carrier frequencies of the adjacent first and second radio channels, and wherein during operation in the second mode the processor controls the shared oscillator unit to generate the local oscillator frequency offset from one of the carrier frequencies of the first and second radio channels.

19. The dual-mode receiver of claim 13 wherein the processor connects the first and second image-rejecting downconverters to different antennas when the receiver operates in either the first or second modes.

20. The dual-mode receiver of claim 13 wherein the first mode comprises a dual-carrier mode, and wherein the second mode comprises a diversity mode.

\* \* \* \* \*